United States Patent [19]

Crouse, III et al.

[11] 4,186,214
[45] Jan. 29, 1980

[54] MOLASSES CHEWING GUM

[75] Inventors: Vernon J. Crouse, III, Hagerstown; Robert F. Farmer, III, Rockville, both of Md.

[73] Assignee: The Gillette Company, Boston, Mass.

[21] Appl. No.: 910,477

[22] Filed: May 30, 1978

[51] Int. Cl.$^2$ .............................................. A23G 3/30
[52] U.S. Cl. ......................................................... 426/3
[58] Field of Search ........................................ 426/3-6

[56] References Cited

U.S. PATENT DOCUMENTS

| 280,115 | 6/1883 | Aubin | 426/3 |
|---|---|---|---|
| 2,273,425 | 2/1942 | Traylor | 426/4 |
| 3,974,293 | 8/1976 | Witzel | 426/4 |
| 3,984,574 | 10/1976 | Comollo | 426/4 |

Primary Examiner—Jeanette M. Hunter
Attorney, Agent, or Firm—Richard A. Wise; Leonard J. Janowski

[57] ABSTRACT

A synthetic polymer-based chewing gum having a prolonged flavor release due to the inclusion of molasses.

7 Claims, No Drawings

MOLASSES CHEWING GUM

BACKGROUND OF THE INVENTION

1. Field of the Invention

This invention relates to chewing gum, and more particularly to a chewing gum containing molasses to impart a longer lasting flavor.

2. Description of the Prior Art

Conventional chewing gum compositions are subject to dissipation of flavor before the end of the "chewing" life normally associated with the gum. Thus, while gum compositions are usually considered "chewable" for hours, the flavor becomes imperceptible in a considerably shorter period, as little as 3 to 5 minutes. Obviously, depending upon the particular gum formulation and the flavors in use, variations will occur in the time over which the flavor endures while the gum is being chewed.

Many methods have been devised in the past to improve the flavor quality of gum compositions. Those attempts have included coating the flavors with a sugar shell prior to incorporation into chewing gum, incorporating the flavor in the form of solid flavor particles, and encapsulating volatile, water immiscible flavoring oils in an encapsulating material, i.e., gelatin, to provide the controlled release of flavor in gum products.

While these and other similar prior art methods for prolonging flavor qualities in chewing gum compositions have been relatively effective, such methods many times require special manufacturing techniques and procedures which can be expensive and are therefore unattractive. Thus, an effective method for prolonging flavor in chewing gum containing essential oil flavoring materials, which does not entail extensive revision of usual manufacturing procedures, has not yet been developed.

SUMMARY OF THE INVENTION

The present invention is a chewing gum composition having prolonged flavor qualities while being chewed. The gum comprises from about 15% to about 40% by weight of a synthetic polymer gum base, from about 0.1% to about 3% by weight of a natural or synthetic essential oil flavor, and from about 1% to about 20% by weight of molasses which acts with the gum base to extend the time over which flavor is released while the gum is being chewed.

DETAILED DESCRIPTION OF THE INVENTION

In carrying out the present invention, molasses is added to a synthetic polymer-based chewing gum to extend the time over which flavor is delivered by the gum. Molasses is known to act as a humectant and antioxidant when included in food products. However, nothing in the prior art suggests that adding molasses to synthetic polymer-based chewing gums will increase the time over which flavor is released during chewing. For purposes of this invention, molasses is defined as the non-crystalizing residual syrup resulting from the extraction of sucrose from cane juice. The remaining liquor after each subsequent extraction is characterized as first, second, third, or final molasses. Edible molasses is prepared by blending various grades to a characteristic flavor and color profile.

The most important characteristics of molasses are its sugar content and its organic non-sugar fractions. The exact composition of molasses varies widely depending on its source, processing conditions, and final blending. However, it typically contains 50% to 75% total sugars. This includes both sucrose and reducing or invert sugars. The ratio of sucrose to invert sugars is usually between 1.5:1 and 2.5:1. In addition, there is a complex organic non-sugar fraction which comprises 20% to 40% of the syrup. This is a mixture of organic acids including amino acids and other nitrogenous compounds, pigments, waxes, sterols, and lipids. The exact composition of molasses is described more fully in "Composition of Cane Juice and Cane Final Molasses", Scientific Report Series, Number 15, Sugar Research Foundation, Incorporated, 1953, by W. W. Binkley and M. L. Wolfrom. A typical molasses for use in chewing gum of the present invention would exhibit the following characteristics at a Brix Spindle (1:1 dilution at 20° C.) of 79.5:

| Component | g/100g of molasses |
| --- | --- |
| Sucrose | 30–40 |
| Invert Sugar | 15–40 |
| Total Sugar | 50–75 |

The methods for determining the above properties of molasses are described in the "Official Methods of Analysis of the Association of Analytical Chemists", W. Horwitz, Editor 12th Edition, 1975, Section 31:065 through Section 31:089, incorporated herein by reference.

Molasses with the above characteristics may be used either without further modification or as a commercially available free-flowing powder form which is made by drying molasses with the above characteristics on corn syrup solids.

The gum base formulation and the manner in which it interacts with other chewing gum components contribute to the perceived quality of the chewing gum. Gum bases are typically formulated from a combination of various masticatory substances, plasticizers (softening agents), fillers, emulsifiers, pigments, and general purpose additives. The various ingredients are typically employed in the following percentages:

| Ingredients | Weight % |
| --- | --- |
| Masticatory Substance | 5–25 |
| Plasticizers | 30–85 |
| Emulsifiers | 0–15 |
| Filler | 0–35 |
| Pigment | 0–5 |
| Additives | 0–2 |

In the present invention, the masticatory substance of the gum base must include at least 5% of a synthetic polymer such as styrene-butadiene copolymer, isobutylene-isoprene copolymer, polyvinyl acetate, or polyisobutylene.

By styrene-butadiene copolymer is meant the copolymer formed by copolymerizing various combinations of styrene and butadiene. For use in the present invention, the copolymer should have a Mooney Viscosity of between about 40 and about 70, preferably between about 45 and about 55 (ML 4 at 100° C. using ASTM Standard D1646-72). While the above Mooney Viscosity measurements were obtained from dry styrene-butadiene copolymer, the commercially-available latex form of the copolymer can also be used in the practice of the present invention if its Mooney Viscosity is within the above range after it has been dried. By isobutylene-isoprene is meant the synthetic copolymer containing from 0.5 to 2.0 molar percent of isoprene, the remainder consisting of isobutylene. For use in the present invention, the copolymer should have a Mooney Viscosity of between about 40 and about 70, preferably between 43 and 58 (ML-12 at 125° C. using ASTM Standard D1462-72). Polyisobutylene for use in the present invention is formed by the polymerization of isobutylene. The resulting polymer will typically have a molecular weight between about 37,000 and about 90,000 (Flory Molecular Weight according to AM-S 77-005). By polyvinyl acetate is meant the polymer formed by the polymerization of vinyl acetate, the resulting product having a minimum molecular weight of at least 2,000. In addition, the gum base may also contain natural gums or rubbers conventionally used in chewing gum bases such as chicle, natural rubber, masaranduba balata, gutta hang kang, lechi caspi, and jelutong.

Plasticizers include such substances as paraffin, petroleum waxes, polyethylene, polyvinyl acetate, glycerol, methyl, or pentaerythritol esters of gum or wood resins, lanolin, hydrogenated vegetable oil, cocoa butter, stearic acid and its salts, and natural or synthetic terpene resins. Fillers are typically inorganic compounds such as $CaCO_3$, $MgCO_3$, $Al_2O_3$ and talc. Additionally, small amounts of emulsifiers such as mono-, di-, and triglycerides (i.e., glycerol monostearate), inorganic and organic pigments, and antioxidants (BHA, BHT, propyl gallate) may be included.

Essential oil flavoring materials prolonged by the addition of molasses according to the present invention, include those volatile oils having a characteristic odor which are distilled from plants, leaves, flowers, etc., or prepared synthetically. Representative flavor oils of this type include citrus mint oils such as lemon oil, orange oil, lime oil, grapefruit oil; fruit essences such as apple essence, pear essence, peach essence, strawberry essence, apricot essence, raspberry essence, cherry essence, plum essence, pineapple essence, and the like; peppermint oil, spearmint oil, clove oil, bay oil, anise oil, eucalyptus oil, thyme oil, cedar leaf oil, cinnamon oil, oil of nutmeg, oil of sage, oil of bitter almonds, cassia oil, and methyl salicylate (oil of wintergreen).

While not wishing to be bound by theory, it is believed that the advantageous results of the invention are obtained by an interaction between the synthetic polymer of the gum base and the molasses whereby the synthetic components of the gum base are plasticized resulting in a more uniform release of the essential oil flavoring materials. Certainly, the prior art does not suggest that the addition of molasses to a synthetic polymer-based chewing gum will result in flavor extension. U.S. Patent 280,115, describes a chewing gum composed of a mastic substance and saccharine matter. One of the saccharine materials is molasses. The mastic substances are all natural resinous or wax-like materials, the only ones being named specifically being rosin, paraffin, or spruce-gum. No mention is made in that patent of the use of molasses with any type of natural or synthetic rubber gum base material nor any type of synthetic polymeric material. Thus, it is unexpected that the addition of molasses to a synthetic polymer-based chewing gum prolongs the flavor of the gum throughout its normal "chewing" life.

In order to obtain a sweetened gum, the remaining portion of the gum composition is generally a sweetener such as sugar. By sugar is meant sucrose, dextrose, corn syrup or corn syrup solids, and mixtures thereof. Synthetic sweeteners such as saccharin may be substituted for some of the sugar if a low calorie gum is desired, although it is impossible to prepare a sugarless gum using the present invention because of the sugar content of the molasses. However, when saccharin is substituted, a bulking agent such as sorbitol or mannitol must be added to prevent a variation in the chewing gum's chewing characteristics.

The following examples are given by way of illustration only and are not to be considered as limiting the scope of the invention.

EXAMPLE I

A synthetic gum base consisting of:

| Ingredients | Weight % |
|---|---|
| Styrene-butadiene copolymer | 13.6 |
| Glycerol ester of hydrogenated rosin | 33.6 |
| Carnauba Wax | 8.9 |
| Beeswax | 2.2 |
| $CaCO_3$ | 24.6 |
| Propylene Glycol | 1.1 |
| Stearic Acid | 0.2 |
| Glycerol Monostearate | 6.7 |
| Lecithin | 0.2 |
| Polyvinyl Acetate | 8.9 | was used to prepare the chewing gum. The 210 g of gum base were softened for 10 minutes at 150° F. in a mixer, followed by the addition of 5 g of glycerin. The composition was mixed for 10 minutes and then 130 g of corn syrup and 50 g of molasses having the following characteristics at a Brix Spindle (1:1 dilution at 20° C.) of 79.5:

| Component | g/100g of Molasses |
|---|---|
| Sucrose | 37.3 |
| Invert Sugar | 30.6 |
| Total Sugar | 67.9 |
| Ash | 4.0 |
| pH (G.E. - 60 Brix) | 5.0 | were added and stirred for 10 minutes, after which 595 g of 6X confectioner's sugar was added with stirring. Ten grams of peppermint oil was added and mixed. The resulting composition was formed into sheets, cut into sticks, and wrapped. Molasses-containing gum prepared according to the above method retained its flavor longer than the same composition without molasses.

EXAMPLE II

Gum sticks are prepared according to Example I from the following ingredients:

| Ingredient | Grams |
|---|---|
| Chewing Gum Base* | 21.0 |
| Corn Syrup | 13.0 |
| 6X Confectioners' Sugar | 59.5 |
| Molasses** | 5.0 |
| Glycerin | 0.5 |
| Peppermint Oil | 1.0 |

*CHEWING GUM BASE

-continued

| Ingredient | Weight % |
| --- | --- |
| Isobutylene-isoprene copolymer | 6 |
| Jelutong | 4 |
| Polyvinyl Acetate | 15 |
| Glycerol Monostearate | 3 |
| Microcrystalline Waxes | 20 |
| Rosin Esters | 32 |
| $CaCO_3$ | 20 |

MOLASSES
Brix Spindle (1:1 dilution at 20° C.) 79.5

| Components | g/100g of Molasses |
| --- | --- |
| Sucrose | 37.3 |
| Invert Sugar | 30.6 |
| Total Sugar | 67.9 |
| Ash | 4.0 |
| pH (G.E. - 60 Brix) | 5.0 |

Gum prepared with the above ingredients, when chewed, results in a flavor which is longer lasting than a similar gum not containing molasses.

Having thus described the invention, what is claimed is:

1. A chewing gum composition having prolonged flavor qualities comprising:
   A. From about 15 to about 40 percent by weight of a synthetic polymer-based gum base;
   B. From about 1 to about 20 percent by weight of molasses; and
   C. From about 0.1 to about 3 percent by weight of a natural or synthetic essential oil flavor.

2. A chewing gum composition as claimed in claim 1, in which the synthetic polymer of said synthetic polymer-based gum base is selected from the class consisting of styrene-butadiene copolymer, isobutylene-isoprene copolymer, polyvinyl acetate, and polyisobutylene.

3. A chewing gum composition as claimed in claim 1, in which said molasses contains from about 30% to about 40% by weight of sucrose and from about 15% to 40% by weight of invert sugar, the total of said sucrose and said invert sugar comprising from about 50% to about 75% by weight of said molasses, said percents by weight being determined at a Brix Spindle (1:1 dilution at 20° C.) of 79.5.

4. A chewing gum composition as claimed in claim 1 in which the synthetic polymer component of said synthetic polymer-based gum base comprises at least 5% by weight of said synthetic polymer-based gum base.

5. A chewing gum composition as claimed in claim 1, comprising, in addition, a plasticizer.

6. A chewing gum composition as claimed in claim 1, comprising, in addition, corn syrup.

7. A method for prolonging the flavor qualities of a natural or synthetic essential oil flavored, synthetic polymer-based chewing gum comprising the addition to said chewing gum of from about 1% to about 20% by weight of molasses.

* * * * *